United States Patent
Bhatia et al.

(10) Patent No.: US 6,815,476 B1
(45) Date of Patent: *Nov. 9, 2004

(54) PHOSPHATE FLAME RETARDANT POLYMERS

(75) Inventors: Qamar Bhatia, Fleetwood; Robert Howe, Greenville, both of NY (US)

(73) Assignee: General Electric Company, Schenectady, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/841,028

(22) Filed: Apr. 29, 1997

Related U.S. Application Data

(63) Continuation of application No. 08/472,799, filed on Jun. 7, 1995, now abandoned.

(51) Int. Cl.$^7$ ................................................. C08K 5/53
(52) U.S. Cl. ....................................................... 524/127
(58) Field of Search .......................................... 524/127

(56) References Cited

U.S. PATENT DOCUMENTS

| | | | |
|---|---|---|---|
| 3,869,526 A | * | 3/1975 | Combey et al. ............ 524/127 |
| 3,987,008 A | | 10/1976 | Stackman |
| 4,078,016 A | | 3/1978 | Kramer |
| 4,214,062 A | | 7/1980 | Binsack et al. |
| 4,223,100 A | | 9/1980 | Reinert |
| 4,332,921 A | | 6/1982 | Schmidt et al. |
| 4,463,130 A | | 7/1984 | Serini et al. |
| 4,481,338 A | | 11/1984 | Serini et al. |
| 4,766,165 A | | 8/1988 | Kress et al. |
| 5,061,745 A | | 10/1991 | Wittmann et al. |
| 5,135,973 A | * | 8/1992 | Fukasawa et al. .......... 524/127 |
| 5,204,394 A | | 4/1993 | Gosens et al. |
| 5,290,836 A | * | 3/1994 | Truyen ....................... 524/127 |
| 5,455,292 A | * | 10/1995 | Kakegawa et al. ......... 524/127 |

FOREIGN PATENT DOCUMENTS

| | | |
|---|---|---|
| EP | 0 103 230 A3 | 3/1984 |
| EP | 0 103 230 | 3/1984 |
| EP | 0 103 231 A3 | 3/1984 |
| EP | 0 103 231 | 3/1984 |
| EP | 0 363 608 A1 | 4/1990 |
| EP | 0 363 608 | 4/1990 |
| EP | 521628 * | 1/1993 |
| JP | 54157156 A | 12/1979 |
| JP | 57-207641 A | 12/1982 |
| JP | A-57 207 641 | 12/1982 |
| JP | 9024-736 A | 2/1984 |
| JP | 57-134868 | 2/1984 |
| JP | 57-156378 | 3/1984 |
| JP | 59-202240 | 11/1984 |
| JP | 06-228426 * | 8/1994 |
| JP | A-08 073 654 | 3/1996 |
| JP | 08-073654 A | 3/1996 |
| WO | WO 93/04119 | 3/1993 |

OTHER PUBLICATIONS

Phosphorus Based Additives for Flame Retrdant Polyeser. 1. Low Molecular Weight Additives Robert W. Stackman.

* cited by examiner

Primary Examiner—Veronica P. Hoke

(57) ABSTRACT

A flame retardant moldable thermoplastic resin composition consisting of a thermoplastic resin and a flame retardant consisting of a combination of a low molecular weight phosphate having a molecular weight of about 500 to about 2000 and a high molecular weight phosphate having a molecular weight of about 2300 to about 11,000 and to articles molded therewith. The composition has a high heat deflection temperature, good impact resistance, excellent flame retardancy and good flow for easier processing.

12 Claims, No Drawings

PHOSPHATE FLAME RETARDANT POLYMERS

This is a continuation of of application Ser. No. 08/472,799 filed on Jun. 7, 1995, now abandoned.

BACKGROUND OF THE INVENTION

The present invention relates to flame retarded polymer composition for molding applications which polymer composition comprises in admixture a thermoplastic molding resin and a particular phosphate flame retardant. The phosphate fame retardant comprises a combination or mixture of two phosphates, namely a low molecular weight and a high molecular weight phosphate and to articles molded with the composition of this invention.

The prior art has disclosed the use of phosphates as flame retardants for polymers or thermoplastic molding resins particularly such monophosphates as triphenyl phosphate, tricresyl phosphate, diphenylcresyl phosphate and the like. Such monophosphate esters tend to migrate to the surface when the thermoplastic composition is molded such as injection molding causing so called "juicing." Juicing is where the additive migrates to the surface of the molded article during molding. Also in order to obtain good flame retardancy, often other flame retardants need to be employed with the momophosphate esters, particularly halogen containing flame retardants, Halogen flame retardants are undesirable because of the environment concerns and the pitting of the mold surface. On the other hand, if high concentrations of the particular phosphate esters are employed a decrease in heat resistance and impact resistance can result.

Gosen et al U.S. Pat. No. 5,204,394 discloses a composition of an aromatic polycarbonate, a styrene containing copolymer such as acrylonitrile-butadiene-styrene (ABS) and oligomeric phosphate flame retardants. The patent further discloses that the oligomeric phosphate employed therein may be a blend of several different oligomers (column 4 lines 46–66).

However, no prior art example has been uncovered that discloses the use of high molecular weight phosphates as flame retardant, i.e. the high molecular weights of the magnitude employed herein, or the combination of a low molecular weight phosphate and a high molecular weight phosphate as employed in the instant invention.

Therefore, the object of the present invention is to provide a thermoplastic molding composition having good flame retardant properties without the use of halogenated flame retardant.

A further object of the present invention is to provide a flame retardant composition having good heat deflection temperature and impact resistance.

Another object of the present invention is to provide a flame retardant molded thermoplastic article prepared from the composition of this invention and having good mechanical properties of heat deflection and impact resistance.

These and other objects of this invention will become apparent from the following description of this invention.

SUMMARY OF THE INVENTION

This invention is directed to a thermoplastic resin molding composition having excellent flame retardant properties using a non halogenated flame retardant while maintaining good mechanical properties of heat deflection temperature, impact resistance and flow. Specifically the flame retardant employed herein is a combination of a low molecular weight phosphate and a high molecular weight phosphate. The low molecular weight phosphate has a molecular weight of at least about 500 and preferably about 500 to about 2000. The high molecular weight phosphate has a molecular weight of at least about 2300 and preferable about 2300 to about 11,000.

DETAILED DESCRIPTION OF THE INVENTION

As stated previously, the invention is directed to a flame retardant thermoplastic molding composition and to articles molded therefrom. The flame retardant thermoplastic molding composition comprises in admixture a thermoplastic molding resin and a flame retardant additive comprising in combination a low molecular weight and a high molecular weight phosphate. The phosphates employed herein are preferably represented by the following formula:

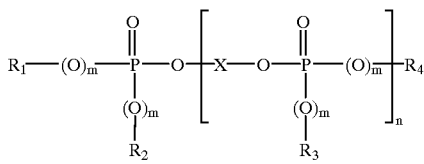

wherein $R_1$, $R_2$, $R_3$ and $R_4$ are independently selected from the group consisting of an aryl or an alkarly group, X is an arylene group, m is an integer of from 0 or 1. In the case of the low molecular weight phosphate, the phosphate is an oligomeric phosphate wherein n is an integer of from 1 to 5. The low molecular weight phosphate of this invention with or without this above formula has a molecular weight of at least about 500 and preferable about 500 to about 2000 wherein n is 1 to 5. The high molecular weight phosphate of this invention with or without this above formula has a molecular weight of at least about 2300 and preferably about 2300 to about 11,000 wherein n is an integer of from about 6 to 35. More preferably, the high molecular weight phosphate of this invention has a molecular weight of at least about 5000 and most preferably at least about 7500. It is important that the molecular weight of the low molecular weight phosphate does not overlap the molecular weight of the high molecular weight phosphate.

In the above formula, the aryl groups may be aryl or an alkyl substituted aryl group thus alkaryl groups. Preferable the aryl groups are independently selected from cresyl, phenyl, xylenyl, propylphenyl and butylphenyl groups. The arylene group is derived from a dihydric compound and is preferable resorcinol, hydroqinone and bisphenol-A. More particularly the aryl group ($R_1$, $R_2$, $R_3$ and $R_4$) is phenyl and the more particular arylene group is bisphenol-A. In the case of the low molecular weight phosphates, the more preferred low molecular weight phosphate is bisphenol-A tetraphenyl diphosphate wherein n is 1, m is 1, X is bisphenol-A and the R's are phenyl with this more preferred low molecular weight phosphate having a molecular weight of about 693.

In the case of the high molecular weight phosphate, the most preferred is bisphenol-A phenyl polyphosphate having a molecular weight of about 10,056. In this most preferred high molecular weight phosphate of the above formula , the R's are phenyl groups, X is bisphenol-A, m is 1 and n is about 32.

In the practice of the invention, the thermoplastic resin employed herein can be any of the thermoplastic molding resins that can be molded by injection molding, compression molding, transfer molding, extrusion blow molding or profile extrusion. The preferred thermoplastic molding resins are aromatic polycarbonates, high impact polystyrenes, styrene containing copolymers and styrene containing graft copolymers such as acrylonitrile-butadiene-styrene (ABS) resins, polyphenylene ether resins, polyalkylene terephthalate resins such as polybutylene terephthalate, polyethylene terephphalate, and polypropylene terephthalate resins, polyether imide resins, polyether imide ester resins, polyamide resins, polyphenylsulfide resins, polyphenyl sulfones, polyimide resins and mixtures thereof. The most preferred resins are aromatic polycarbonates, blends of aromatic polycarbonates and ABS, blends of polyphenylene ethers and high impact polystyrenes, and polyether imides.

The amount of phosphate employed can be that amount of phosphate which renders the thermoplastic molding resin composition flame retardant while maintaining good properties of heat deflection temperature, impact resistance and flow. Preferable the composition of the invention contains about 3 to about 25 weight percent of the phosphate flame retardant based on the total weight of thermoplastic resin and phosphate flame retardant and preferably about 5 to about 20 weight percent thereof.

The flame retardant of this invention is a combination of a low molecular weight and a high molecular weight phosphate. The flame retardant consists essentially of about 10 to about 90 weight % of the low molecular weight phosphate and correspondingly 90 to about 10 weight % of the high molecular weight phosphate based on the weight of the flame retardant. Preferable the combination of phosphates consists essentially of about 40 to about 70 weight % of the low molecular weight phosphate and correspondingly about 60 to about 30 weight % of the high molecular weight phosphate. In addition, other additives may be employed with the composition of this invention such as other flame retardant enhancing additives, reinforcing additives such as glass fibers, other mineral additives such as mica, talc, oxides, including plasticizers, light and heat stabilizer, processing aides, impact modifiers, mold release agents, etc.

The compositions of this invention produce molded articles having a combination of excellent properties, depending on the thermoplastic resin employed and the application for the molded article. Preferably, molded articles from the composition of this invention have a notched Izod of at least about 5.0 ft.-lbs/in., as determined in accordance with ASTM D 256, a heat deflection temperature under load of at least about 200° F. as determined in accordance with ASTM D 648, a flow of at least about 18" by the spiral flow measurement of a 1/8" thick channel and a flammability rating of at least V1 as determined in accordance with Underwriters Laboratory Bulletin UL 94. IN the case of an ABS injection molding resin employing the flame retardant of this invention, an injection molded article may preferably have a notched Izod of at least about 7.0 ft.-lbs/in., a heat deflection temperature under load of at least about 200° F., a flow of at least about 25.0" and a UL 94 rating of at least V1. In the case of a polyphenylene ether resin system employing the flame retardant of this invention, an injection molded article may preferably have a heat deflection temperature of at least about 200° F., a flow of at least about 15" and a UL 94 rating of at least V1.

DETAILED DESCRIPTION OF THE PREFERRED EMBODIMENTS

The following Examples are provided to illustrate various embodiments of this invention. The Examples are for the purpose of illustration only, and should not be regarded as limiting the invention to any of the specific materials or conditions described therein.

EXAMPLE 1

The materials employed in this Example as components parts were as follows:

PC—an aromatic polycarbonate derived from bisphenol-A and a carbonyl chloride (phosgene) having a weight average molecular weight of about 22,000 and an intrinsic viscosity (I.V.) of about 0.40 dl/g as measured in methylene chloride at 25° C.

HRG—a high rubber graft copolymer prepared by grafting a styrene-acrylonitrile onto a butadiene rubber in a 50/50 ratio Phosphate 1—a mixture of several oligomeric diphosphates based on resorcinol Phosphate 2—Bisphenol-A tetraphenyl diphosphate having a molecular weight of about 693.

Phosphate 3—Bisphenol-A phenyl polyphosphate having a molecular weight of about 10,056.

PTFE—polytetraflouroethylene

The components of the formulations as reported in Table 1 were compounded in a 30 mm Werner Pfleider twin screw extruder at melt temperatures of about 550–560° F. and extruded. The extrudate was pelletized and the pellets were then dried at about 190° F. for about three (3) hours. The pellets were then molded into standard test specimens in accordance with the ASTM test procedure employed for determining the particular properties which are reported in Table 1 below. Impact resistance was determined by the Notched Izod impact test procedure ASTM D256 on molded specimens having a thickness of about 1/8". Heat deflection temperatures (HDT) under load (264 psi) were measured on molded 1/4" test bars in accordance with ASTM test procedure D648. Spiral flow measurements were performed in a 1/8" thick channel at a melt temperature of about 480° F. and a mold temperature of about 150° F. The higher the length of the flow, the better is the flow of the specimen and easier to process. Flammability was determined on 1/16" thick test specimens in accordance with Underwriters Laboratory Bulletin UL94 flammability rating V0, V1 and V2.

The results of the test are regarded in Table 1 below:

TABLE 1

| Blend | 1 | 2 | 3 | 4 |
|---|---|---|---|---|
| HRG | 81.05 | 80.05 | 80.05 | 80.05 |
| Phosphate 1 | | | | 11 |
| Phosphate 2 | 10 | | 6 | |
| Phosphate 3 | | 11 | 5 | |
| PTFE | .2 | .2 | .2 | .2 |
| Additives | .95 | .95 | .95 | .95 |
| PROPERTIES | | | | |
| Notched Izod (ft-lb/in) | 9.0 | 7.1 | 8.6 | 2.3 |
| HDT (° F.) | 204 | 236 | 214 | 188 |
| Flow Channell (") | 28 | 25.5 | 29.75 | 32.5 |
| UL 94 (1/16") | V0 | V2 | V0 | V0 |

Additives - stabilizer package of a hindered phenol, a phosphite and a lubricant

EXAMPLE 2

Example 1 was repeated except that the formulations employed herein are as reported in Table 2 below. The polyphenylene ether employed had an I.V. of about 0.46 dl/g and was produced by General Electric Company. The high impact polystyrene (HPS) was produced by GE-Huntsman Co., Selkirk, N.Y., and had a weight average molecular weight of about 200,000 and a rubber content of about 10½ weight % based on the weight of the high impact polystyrene. The properties obtained were determined employing the same test procedures employed in Example 1. The results obtained are set forth in Table 2 below.

TABLE 2

| Blend | 1 | 2 |
|---|---|---|
| Polyphenylene ether | 50.5 | 50.5 |
| High impact PS (HPS) | 28 | 28 |
| Phosphate 1 | 16.7 | 10.7 |
| Phosphate 3 | 0 | 6.0 |
| Polyethylene | 1.25 | 1.25 |
| Additives | 1.0 | 1.0 |
| Impact modifier | 2.55 | 2.55 |
| PROPERTIES | | |
| HDT (° F.) | 193 | 228 |
| Flow Channel (") | 20.5 | 19.75 |
| UL 94 | V0 | V0 |

PS - Polystyrene
Impact modifier - a styrene-butadiene block copolymer produced by Shell Chemical Co., Kraton G1650
Additives - a stabilizer package of a phosphite, an oxide and a sulfide
Polyethylene - a mold release agent As shown from the Examples, the use of a low molecular weight and a high molecular weight phosphate produced results of good impact resistance, high heat deflection temperature under load, good flow for easy processing and excellent flame resistance. This is shown in Table 1 blend 3 in comparison to the other blends. Please note blend 1 which employed a low molecular weight bisphenol-A tetraphenyl diphosphate (oligomeric diphosphate); blend 2 which employed a high molecular weight bisphenol-A polyphosphate; and blend 4 which employed a mixture of oligomeric diphosphates. The unexpected results showed that the composition of this invention (blend 3) had good overall properties compared to the comparative blends 1, 2 and 4. In Table 2, equivalent results were obtained when employing a polyphenylene ether composition. Significantly better heat deflection temperature under load (264 psi) was obtained with the composition of this invention namely blend 2 of Table 2. Also flame retardant migration (juicing) was noticeably lacking from the composition of this invention.

In addition to the polymers employed in these Examples, the other polymers disclosed herein will produce equivalent results to those obtained with the polymers of Example 1 and 2.

While variations of this invention will be suggested to those skilled in the art, in view of the above disclosure, any such variations are intended to be within the scope of the claims appended hereto.

What is claimed is:

1. A moldable flame retardant thermoplastic resin composition comprising in admixture a moldable thermoplastic resin and a sufficient amount of a flame retardant to render the composition flame retardant which flame retardant consists essentially of, in combination, about 10 to about 90 weight % of a low molecular weight aromatic phosphate ester having a molecular weight of at least about 500 and about 90 to about 10 weight % of a high molecular weight aromatic phosphate ester having a molecular weight of at least about 5000, providing that the molecular weights do not overlap each other, wherein both said low molecular weight aromatic phosphate ester and said high molecular weight aromatic phosphate ester are of the following formula:

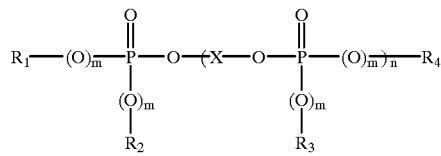

wherein $R_1$, $R_2$, $R_3$ and $R_4$ are independently selected from the group consisting of an aryl or an alkyaryl group, X is derived from Bisphenol-A; m is an integer of from 0 and 1; O is oxygen; P is phosphorus; n of said low molecular weight aromatic phosphate ester is an integer of from 1 to 5; and n of said high molecular weight aromatic phosphate ester is an integer of from 6 to 35; wherein molded articles from said composition have a matched Izod of at least about 5.0 ft.-lbs/in. as determined in accordance with ASTM D 256, a heat deflection temperature under load of at least about 200° F. as determined in accordance with ASTM D 648, a flow of at least about 18" by the spiral flow measurement of a ⅛" thick channel and a flammability rating of at least V1 as determined in accordance with Underwriters Laboratory Bulletin UL 94.

2. The composition of claim 1 wherein the low molecular weight aromatic phosphate ester has a molecular weight of about 500 to about 2000.

3. The composition of claim 1 wherein the high molecular weight aromatic phosphate ester has a molecular weight of about 5000 to about 11,000.

4. The composition of claim 1 wherein the flame retardant consists essentially of 40 to 70 weight % of said low molecular aromatic phosphate ester and, correspondingly, 60 to about 30 weight % of said high molecular weight aromatic phosphate ester.

5. The compositions of claim 1 wherein the thermoplastic resin is selected from the group consisting of aromatic polycarbonates, polyphenylene ethers, polyalkylene terephthates, polyetherimides, polyetherimide esters, polyamides, styrene containing polymers and blends thereof.

6. The composition of claim 5 wherein the thermoplastic resin is an admixture of an aromatic polycarbonate and a styrene containing polymer.

7. The composition of claim 6 wherein the styrene containing polymer is acrylonitrile-butadiene-styrene.

8. The composition of claim 5 wherein the thermoplastic resin is an admixture of a polyphenylene ether resin and a high impact polystyrene.

9. The composition of claim 1 consisting essentially of about 75 to about 97 weight % of the thermoplastic resin and, correspondingly, about 25 to about 3 weight % of the flame retardant.

10. The composition of claim 1 consisting essentially of about 80 to about 95 weight % of the thermoplastic resin and, correspondingly, about 20 to about 5 weight % of the flame retardant.

11. A molded article molded from the compositions of claim 1.

12. A molded article molded from the composition of claim 5.

* * * * *